United States Patent [19]

Kress et al.

[11] Patent Number: 5,655,855
[45] Date of Patent: Aug. 12, 1997

[54] TOOL FOR PRECISE MACHINING OF METAL

[75] Inventors: Dieter Kress, Aalen; Friedrich Häberle, Lauchheim, both of Germany

[73] Assignee: Mapal Fabrik fur Prazisionswerkzeuge Dr. Kress KG, Aalen, Germany

[21] Appl. No.: 522,910

[22] Filed: Sep. 1, 1995

[30] Foreign Application Priority Data

Sep. 1, 1994 [DE] Germany .................... 44 31 149.4

[51] Int. Cl.⁶ .................................................. B23B 41/00
[52] U.S. Cl. ........................... 408/56; 408/83.5; 408/146; 408/201
[58] Field of Search ................. 408/37, 56, 57, 408/146, 83.5, 239 A, 201, 203, 225, 224; 7/158, 167, 168

[56] References Cited

U.S. PATENT DOCUMENTS

| | | |
|---|---|---|
| 3,157,068 | 11/1964 | Rickert . |
| 3,764,204 | 10/1973 | Kammeraad . |
| 4,147,462 | 4/1979 | Appleby et al. .................. 408/83.5 X |
| 4,303,360 | 12/1981 | Cayen et al. .................... 408/239 A X |
| 4,408,935 | 10/1983 | Miyanaga ......................... 408/56 X |
| 4,583,894 | 4/1986 | Mitchell ........................... 408/239 A X |
| 4,852,196 | 8/1989 | Martin ............................... 408/224 X |
| 4,896,638 | 1/1990 | Shepley . |
| 4,951,578 | 8/1990 | von Haas et al. ................ 408/56 X |
| 4,957,398 | 9/1990 | Schneider et al. ............... 408/56 X |
| 5,033,552 | 7/1991 | Hu ...................................... 7/158 X |
| 5,044,841 | 9/1991 | Biera et al. . |
| 5,405,220 | 4/1995 | Ishikawa ............................ 408/56 |
| 5,425,604 | 6/1995 | Scheer et al. ..................... 408/201 X |

FOREIGN PATENT DOCUMENTS

| | | |
|---|---|---|
| 0323044 | 12/1988 | European Pat. Off. . |
| 0571818 | 5/1993 | European Pat. Off. . |
| 4340465 | 7/1994 | Germany . |
| 0805714 | 8/1956 | United Kingdom . |

OTHER PUBLICATIONS

Dieter Kress, "Precise Machining of Bores", Werkstatt und Betrieb (Things and Operation), 1992, No. 8, pp. 619–622.

*Primary Examiner*—Daniel W. Howell
*Assistant Examiner*—Henry W. H. Tsai
*Attorney, Agent, or Firm*—Anderson Kill & Olick P.C.

[57] ABSTRACT

A tool for precise machining of metal includes two tool parts located one within the other and formed as an inner tool and a tool head respectively, and coupling elements which enable automatic replacement of the tool.

11 Claims, 3 Drawing Sheets

TOOL FOR PRECISE MACHINING OF METAL

BACKGROUND OF THE INVENTION

The invention relates to a tool, in particular, a tool for precise machining of metal and including two parts arranged one within the other.

The tools of the above-described type are also called a feed-out system. They include an outer tool part called a tool head and inner tool part called an inner tool axially displaceable within the tool head, in particular, in the direction of a common rotational axis of the two tool parts. The tool head is driven by a special spindle inside of which there is provided an inner spindle for driving the inner tool. The inner spindle is axially displaceable in the direction of the rotational axis so that the inner tool is displaced relative to the tool head. The manufacturing of spindles for a such feed-out system is very costly. Further, such spindles are characterized by a large length. Therefore, the costs of such spindles are very high. They require expensive modification of machine-tools in which such a feed-out system is used. A further serious drawback of such systems consists in that the tools of such feed-out system can be replaced only manually, which requires a lengthy and cost-intensive exchange.

Accordingly, an object of the invention is to provide a tool of the above-described type having a substantially simpler construction and which can be universally used.

SUMMARY OF THE INVENTION

This and other object of the invention, which will become apparent hereinafter, are achieved by providing coupling elements which enable an automatic replacement of the tool. Providing coupling elements, which enable automatic replacement of the tool, insures that the two-part tool can be universally used, and special operational steps for effecting the replacement are not needed. Different tools of this type can be use in both, a transfer line and in an automatic machining center.

Preferred is an embodiment of the tool in which a form-locking connection of the two tool parts insures that drive forces, acting on the outer tool part or the tool head, are transmitted to the inner tool part or the inner tool. That is the drive of the inner tool is insured by the outer tool part, so that special spindles, which are necessary with the known feed-out systems, are not any more necessary for the use of these tools.

Preferred further is an embodiment of the tool, in which the form-locking connection between the two tool parts is effected with spline elements which insure the displacement of the inner tool without any tilting.

A further preferred embodiment of the tool is characterized in that the inner tool is connected with a drive element, which extends through the spindle retaining the outer tool part and which enables the axial displacement of the inner tool within the outer tool part. It is especially advantageous that for effecting axial displacement of the inner tool, a conventional hydraulic cylinder is used, so that a cost-effective forming of this embodiment of the tool becomes possible.

In a still further preferred embodiment of the tool, means are provided for rotating the drive element, which effects axial displacement of the inner tool, in the same direction and with the same circumferential speed as the inner tool is rotated.

Thereby, the frictional forces between the drive element and the inner tool are eliminated and, in addition, the wear of the coupling for the inner tool is reduced to a minimum.

In yet another preferred embodiment of the tool, the inner tool is connected with a coolant supply system. Thereby it is insured that the tool can be used for effecting conventional machining processes.

In an especially preferred embodiment of the tool, the coolant supply system is automatically connected or disconnected. This provides a possibility for the automatic replacement of tool having two, located one within the other tool parts.

In a further especially preferred embodiment of the tool, the coolant supply system is combined with the drive element which effects axial displacement of the inner tool. That is the drive element is formed as a hollow shaft, through which the coolant is able to flow. This embodiment is characterized by an especially small and compact construction.

BRIEF DESCRIPTION OF THE DRAWINGS

The features and objects of the present invention will become more apparent, and the invention itself will be best understood from the following detailed description of the preferred embodiments when read with reference to the accompanying drawings, wherein.

DETAILED DESCRIPTION OF PREFERRED EMBODIMENTS

Figure 1:
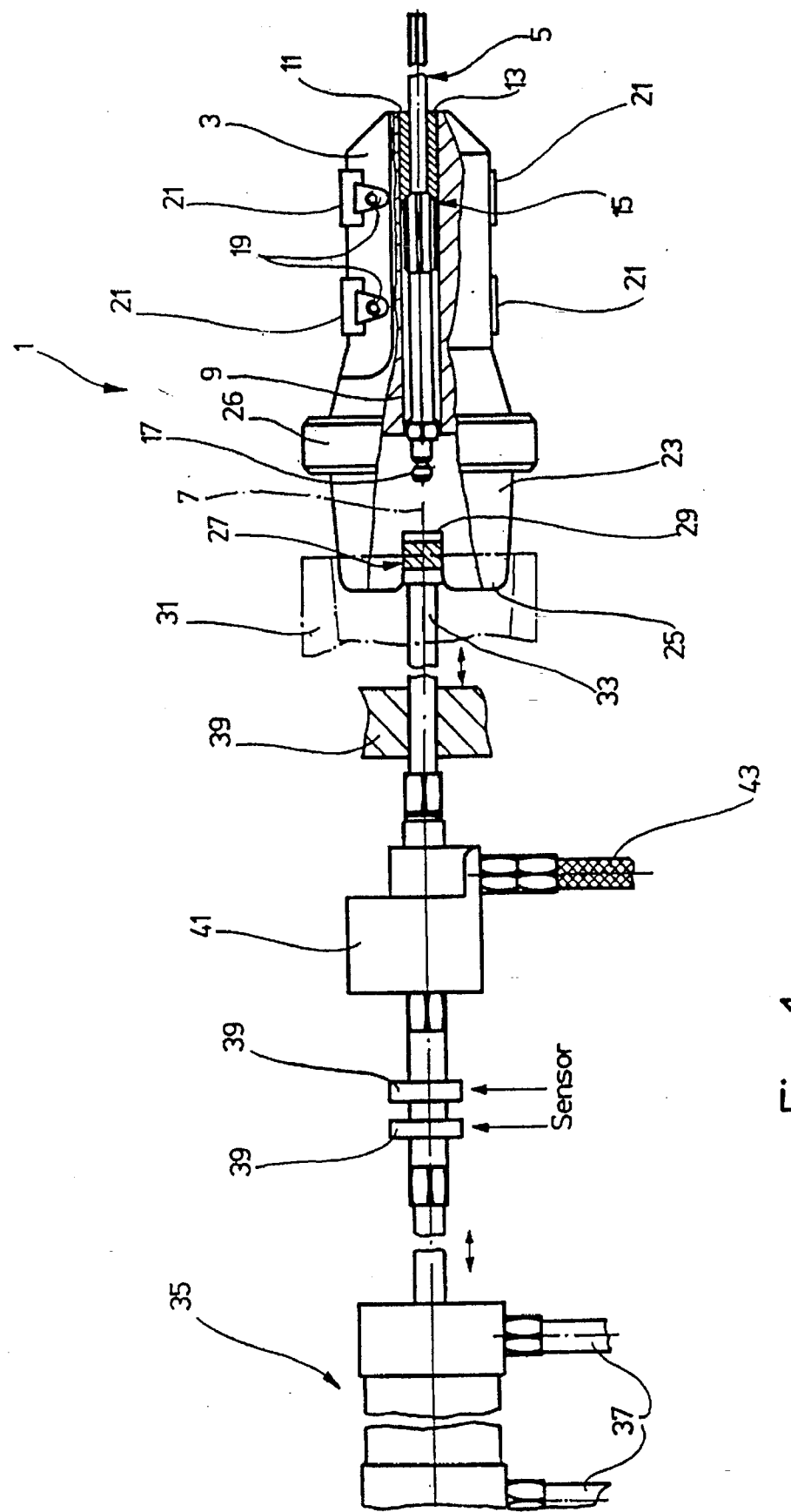
FIG. 1 is a diagrammatic view of a tool according to the present invention, with elements of a coolant supply system and of a hydraulic device for imparting axial movement to the inner tool.

FIG. 1 shows a partially cross-sectional view of a tool 1 having two tool parts arranged one within the other, of which the outer tool part will be denoted below as a tool head 3 and the inner tool part—as an inner tool 5. The tool head 3 has a bore 9, which coincides with its central or rotational axis, for receiving the inner tool 5. The bore 9 extends along the entire length of the tool head 3. In the region of an end face 11 of the bore 9, a sleeve 13, preferably a high-speed guide sleeve is provided, the outer diameter of which substantially corresponds to the inner diameter of the bore 9 and the inner diameter of which is selected to so correspond to the outer diameter of the inner tool 5 that the tool is optimally guided and retained even at high rotational speeds. The sleeve 13 primarily serves to prevent lateral movement of the inner tool 5.

The inner tool 5 can, for example, be formed as reamer and be provided, at its front end, with at least one tip and, if necessary, with associated guide beads. It can, for example, be used for internal machining of valve guides and valve seats in a cylinder head of an internal combustion engine. The sleeve 13 is so formed that the inner tool 5 can be completely displaceable within the inner cavity of the tool head. Here, the inner tool is shown in a position in which it is completely withdrawn out of the tool head 3.

The inner tool 5 is equipped with a drive element 15 which form-lockingly engages the inner surface of the bore of the tool head 3. In this way, a rotational movement of the tool head 3 is immediately transmitted to the inner tool 5, that is there is no need in a separate drive for the inner tool, in particular, in an inner spindle which is necessary in conventional feed-out systems.

It is particularly advantageous when the drive element 15 is formed as a spline shaft because such formation reliably prevents wedging or tilting of the inner tool 5 inside the tool head 3 during axial movement.

At its rear end, the inner tool 5 is provided with a coupling element, which is formed here as a plug-in member 17. The plug-in member 17 is so formed that an axial movement imparting drive can be attached thereto, with simultaneous feeding, through an inner channel of the inner tool 5, not shown, of coolant or lubricant.

The tool head 3 can be formed in a simple manner. For example, bits 21, which are retained by suitable clamping shoes 19, can be seen on the circumference of the tool head 3. The bits 21 can also be provided on the end face 11 of the tool head, the outer contours of which can be formed in a simple manner.

The tool head 3 is provided, at an end face 25 thereof located opposite the end face 11, with a conventional clamping shaft, here, with a hollow shaft 23 which narrows toward the end face 25. The hollow shaft 23 is limited by a conventional installation ring 26.

The plug-in member 17 is located inside of the hollow shaft 23 and is accessible for the coupling element 27, which is formed as a quick-release coupling and includes a coupling ring 29 displaceable in the direction of the rotational axis 7.

The hollow shaft 23 is formed as in conventional tools and can be held with a known chuck 31 which is only outlined here.

The coupling element 27 is arranged at an end of a drive element 33, which is displaceable in the direction of the rotational axis 7 and is force-lockingly connected with, for example, a hydraulic cylinder 35 which is only outlined here and includes corresponding supply and discharge conduits 37. The drive element 33 serves for axial displacement of the inner tool 5 in the tool head 3.

In FIG. 1, the coupling element 27 is disconnected from the plug-in member 17 so that the tool 1 is disconnected from the chuck 31.

The drive element 33 is provided in a convenient location with preferably adjustable stops 39 which limit the axial displacement of the drive element 33 and determine its axial displacement. The left stop can, for example, limit the withdrawal movement to the left, while the right stop can limit the movement of the drive element to the right. The right stop can also serve for displacing the drive element 33 beyond a predetermined end position somewhat to the right to displace the coupling ring 29 into its release position so that the plug-in member 17 is released to provide for an automatic exchange of the tool 1. If necessary, a third stop can be provided, not shown. The stops can be monitored mechanically or with suitable sensors controlled by a control device of the drive element 33 or the hydraulic cylinder 35.

Preferably, the drive element 33 is connected to the control of the chuck 31, so that upon release of the hollow shaft 23 of the tool head 3, the plug-in member 17 is released by the coupling element 27. In this way, an automatic exchange of the tool 1 becomes possible, with automatic disconnection and changing of both the tool head 3 and the inner tool 5.

After the tool 1 is removed from the chuck 31, only the tool head can be replaced with another having, for example, a profile opposite to that shown in FIG. 1. It is also possible to insert, into the tool head 3, a differently formed inner tool 5. If necessary, the sleeve 13 must also be replaced to insure its correspondence to the outer diameter of the inner tool.

During the exchange of the tool 1, the inner tool 5 can be prevented from falling out of the tool head 3 by, for example, O-ring, a pin projecting into the displacement path of the drive element, or a spring-biased lock ball.

FIG. 1 shows that the drive element 33 has at least one support 39 that enables axial displacement of the drive element 33. In addition, there is provided a rotary transmission 41 through which the drive element 33 extends and which enables feeding of scavenging medium and coolant through the conduit 43. The scavenging medium and coolant are fed to the tool 1 through the drive element 33 and into the inner cavity of the inner tool 5 and then, in a known manner, into the region in which the tool 1 machines a workpiece.

Figure 2:
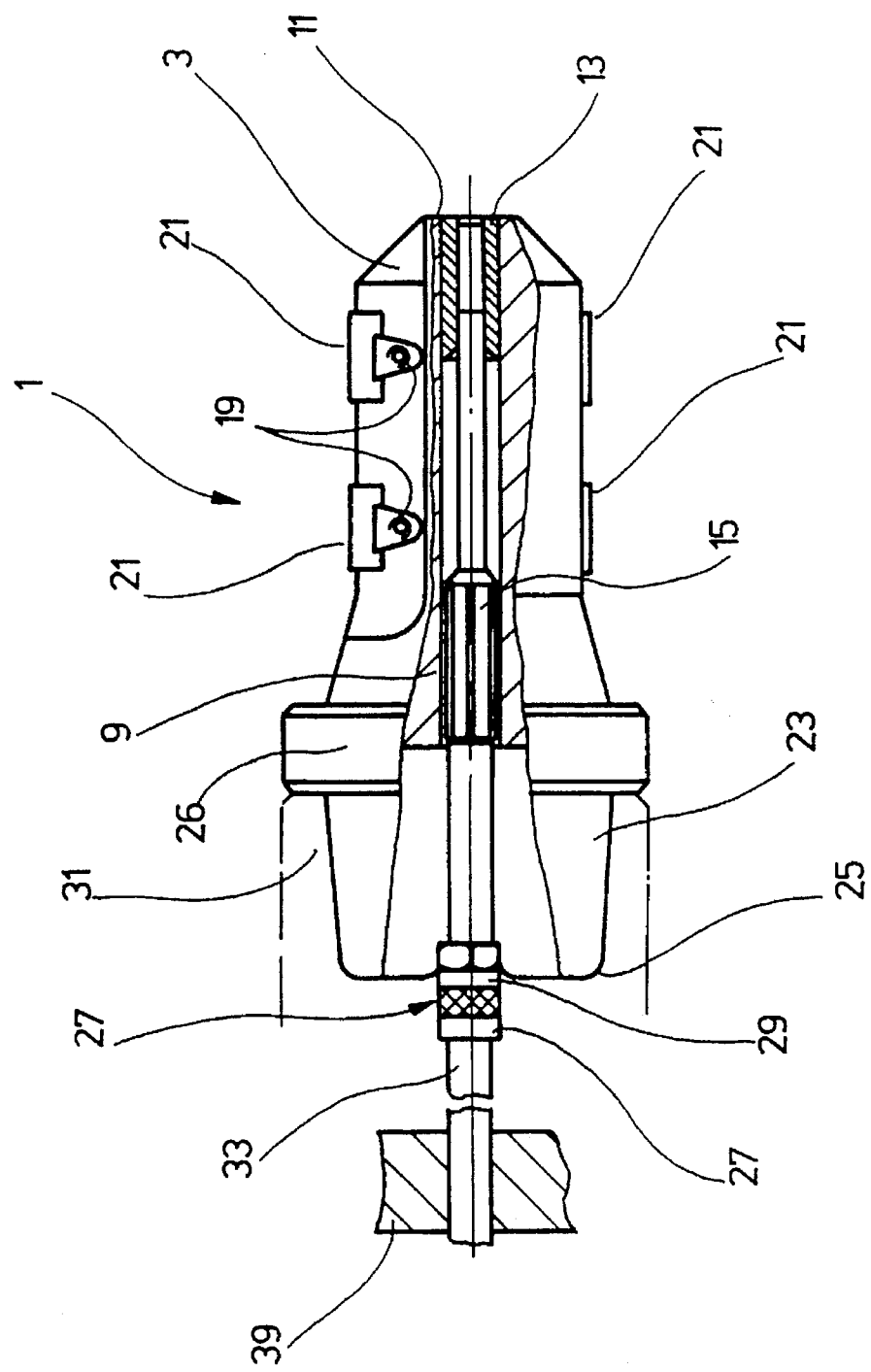
FIG. 2 is a diagrammatic view of a tool according to the present invention with the retracted inner tool.

FIG. 2 shows a tool 1, which was described with reference to FIG. 1, held in the clamping tool 31. The inner tool is connected to the coupling element 27 and, thus, with the drive element 33. In FIG. 2, the same elements are designed with the same reference numerals so that a reference to the description of FIG. 1 can be made.

When the tool 1 is connected with the chuck 31, conventional clamping elements engage into the cavity of the hollow shaft 23 and thereby provide a reliable connection between the tool 1 and the chuck 31. The chuck 31 can be a part of a conventional machine-tool spindle.

In FIG. 2, the inner tool is displaced in its completely retracted position, in which the drive element 33 is completely displaced to the left by the hydraulic cylinder 35 shown in FIG. 1. During axial displacement of the inner tool 5, the supply of the coolant and the scavenging medium through the drive element 33 is not interrupted. The supply can, nevertheless, when desired, be cut off.

Also, in the retracted position, the inner tool 5 is form-lockingly connected with the tool head 3, that is, the rotational movement, which is transmitted to the tool head 3 by the clamping tool 31, is simultaneously applied to drive the inner tool 5 via the drive element 15.

Figure 3:
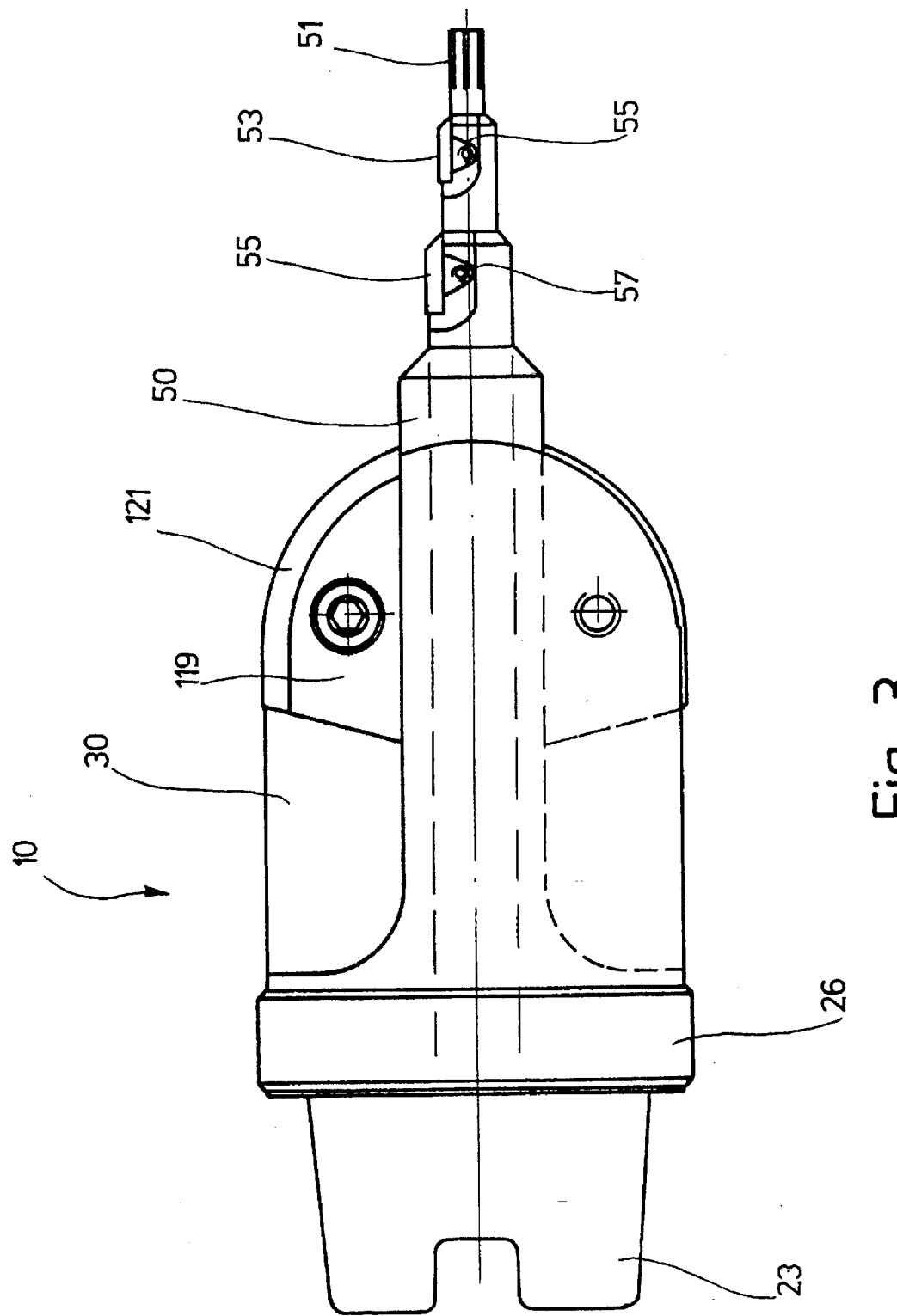
FIG. 3 is a side view of another embodiment of a tool according to the present invention.

FIG. 3 shows a side view of another embodiment of a tool 10 which consists of two tool parts arranged one within the other, namely, an outer tool head 30 and an inner tool 50 located within the outer tool.

The tool head 30 and the inner tool 50 are basically formed as the tool head 3 and the inner tool 5 shown in FIGS. 1 and 2. Specifically, the inner tool 50 is driven directly by the tool head 30, with the means provided in the cavity of the tool head 30 to insure its form-locking connection with the inner tool 50.

A bit 121 is provided on the outer surface of the tool head 30, the front face of which is rounded. The bit 121 is held with a suitable clamp shoe 119.

The inner tool 50 is formed as a stepped tool and has at its front end, for example, a reamer 51 and is further provided, in the adjacent to the reamer region which has a larger diameter, with a bit 53 held with a suitable clamp shoe 55. The following portion of the inner tool 50 again has a larger outer diameter and is also provided with a bit 55 held with a clamp shoe 57.

The shapes of both the other work head 30 and the inner tool 50 are given here only by way of example and they can easily be changed. With an increased outer diameter of the inner tool 50, a larger bore is required in the tool head 30 and a respective adaptation of the sleeve 13. It is also conceivable that the bore in the tool bead 30 would have a constant dimension for different inner tools, and that different sleeves having different diameters would be inserted into the bore to accommodate respective inner tools. In all cases, it is important that the drive of the inner tool be effected directly by the rotation of the tool head, due to their form-locking connection.

The tool head 30 is provided, at its left end, for example, with a hollow shaft 23 with which an installation ring 26 is connected.

Below, the functioning of the tool 1,10 as a Feed-Out-System will be described in detail.

During machining of bores, in particular, inner machining of deep bores with small diameters (8,6,5 mm) such, as for example, present in valve guides, the use of very long, projecting tolls for inner machining is required, which tool, during its first insertion in a machined bore, deviates from its predetermined position, and desired bore dimensions and quality cannot be retained. To prevent this drawback, such bores are often subjected to a preliminary machining with so-called pilots, at which only a first portion of a bore is subjected to machining. It is in this preliminary machined bore, in the following step, that the tool for internal machining is used, without leading to an undesired deviation. In this case, insertion of two different tools is needed.

With the described tool, the tool head 3,30 is received in a chuck 31 with which a drive force is applied thereto causing its rotation. The inner tool 5,50 is at that time in its completely retracted position. In this position, the tool 1,10 is advanced to the machined bore. It is possible, with the embodiment of the tool 30, shown in FIG. 3, to first machine the outer surface of the workpiece. Then, the tool head, if desired, can be retracted somewhat, and the inner tool 5,50 advanced by the drive element 33 in the direction toward the machined workpiece. At that, the frontmost portion of the inner tool 5,50 engages the machined bore. Because the inner tool has only a small projection length, the sleeve 13 insures a reliable guidance so that even the entry region of the machined bore has an outstanding dimensional accuracy and a desired surface quality. The drive element 33 advances only the inner tool 5,50 to a desired length. At that, the inner tool can be retained in any desired position. The specific shape of the form-locking connection between the tool head 3,30 and the inner tool 5,50 insures that the drive force is transmitted from the tool head 3,30 to the inner tool 5,50.

It is further obvious that during machining of a workpiece, the coolant and the scavenging medium provide for both, cooling of the tool 1,10 and carrying away of the produced chips.

By the special formation of the drive element 33 and the coolant supply system 43, the coolant can be fed in all positions of the inner tool 5,50. Despite all of this, the tool 1,10 has a very compact shape.

The important thing is that during machining of a workpiece according to the described method, a particularly high quality is achieved, so that the tool 1,10 is suited in particular for precise machining of bores.

When the tool is used with a transfer line or with a machining center, it can be easily exchanged. It is also possible to combine different tool heads 3,30 with different inner tool 5,50, with different outer diameters of the inner tool being accommodated by appropriate selection of the guide sleeves. It is especially advantageous that in all of the cases the same drive element 15 is used so that the adaptation of the tool head 3,30 is not necessary.

Because the inner tool 5,50 is driven directly by the tool head 3,30, the tool 1,10 can be made very short. In particular, there is not any need in adaptation of the chuck 31 for receiving the tool 1,10.

Further, it is possible to combine the drive element 33 with the rotary transmission 41 to provide for feeding of the coolant and the scavenging medium. It is simply necessary to provide an axially displaceable rod which, at least in the region of the rotary transmission 41, is hollow to feed coolant to the tool. The displacement of the rod can be effected with the hydraulic cylinder 35. For retaining of the tool 1,10, conventional chucks 31 can be used, which are formed substantially in the same way as special spindles used in known Feed-Out-Systems. The chuck 31 is a particular part of a known tool spindle which can be easily adapted to accommodate the drive element 33.

Preferred is an embodiment of the drive element 33 which can be rotated together with the tool spindle or the chuck 31, so that no friction exists in the region of coupling means or coupling element 27 and, therefore, no wear takes place.

The rotation of the drive element 33 can also be effected when the inner tool 5,50, in the region of the plug-in member 17, forms in a suitable manner a form-locking connection with the coupling element 27 for rotation therewith. Preferably, a drive force is applied to the drive element 33 for rotating the same at a location other than that in which release of the coupling connection is effected.

Finally, it should again be pointed out that direct driving of the inner tool 5,50 within the tool 1,10 permits to eliminate a separate drive for the inner tool. Thereby, the chuck 31 can be a part of a conventional tool spindle and, in particular, automatic replacement of the tool 1,10 can be effected in the same way as it takes place with conventional tools not used in Feed-Out-Systems. Therefore, the tool 1,10 can be universally used in transfer lines and machining centers.

Though the present invention is shown and described with reference to the preferred embodiments, different modifications thereof will be apparent to those skilled in the art and, therefore, it is not intended that the invention be limited to the disclosed embodiments and/or details thereof, and departures can be made therefrom within the spirit and scope of the appended claims.

What is claimed is:

1. A tool for precise machining of bore surfaces of concentric bores formed in a workpiece and having different diameters, the tool comprising:

a tool head for machining a bore surface having a larger diameter;

an inner tool located within the tool head for machining a bore surface having a smaller diameter;

means for form-lockingly connecting the inner tool with the tool head for joint rotation therewith and for axial displacement relative thereto, whereby rotational drive forces acting on the tool head are transmitted to the inner tool;

means for axially displacing the inner tool within the tool head; and coupling means for enabling an automatic replacement of the inner tool in the tool head.

2. A tool as set forth in claim 1, wherein the form-lockingly connecting means comprises a drive element formed as a spline member.

3. A tool as set forth in claim 1, wherein the axially displacing means comprises an axially displaceable drive member for axially displacing the inner tool.

4. A tool a set forth in claim 3, further comprising a hydraulic cylinder for axially displacing the drive member within the tool head.

5. A tool as set forth in claim 3, further comprising means for rotating the drive member in a same direction and with a same rotational speed as the inner tool rotates.

6. A tool as set forth in claim 3, wherein the drive member is formed as a hollow rod for conducting coolant to the tool.

7. A tool as set forth in claim 1, further comprising means for feeding coolant to the tool head or the inner tool.

8. A tool as set forth in claim 7, further comprising means for automatically connecting and disconnecting the coolant feeding means.

9. A tool as set forth in claim 1, wherein the tool head has a bore, concentric with an axis of the tool, for receiving the inner tool.

10. A tool as set forth in claim 9, further comprising a guide sleeve located in the bore for guiding the inner tool.

11. A tool as set forth in claim 1, wherein the tool head has a hollow shaft for automatically connecting the tool to and disconnecting from a chuck.

* * * * *